United States Patent [19]
Breuil

[11] Patent Number: 5,560,940
[45] Date of Patent: Oct. 1, 1996

[54] DEVICE FOR MELTING MATTER BY IMMERSION IN A BATH OF HOT LIGUID

[75] Inventor: Dany Breuil, Lavans Les Saint Claude, France

[73] Assignee: SMOBY, Saint-Claude, France

[21] Appl. No.: 375,575

[22] Filed: Jan. 18, 1995

[30] Foreign Application Priority Data

Jan. 20, 1994 [FR] France ................... 94 00809

[51] Int. Cl.⁶ ............................ B29B 11/00; B29B 15/00
[52] U.S. Cl. .................. 425/151; 425/384; 425/DIG. 13; 425/DIG. 57; 425/DIG. 39; 249/78; 249/79
[58] Field of Search ................ 446/14, 481; 425/384, 425/DIG. 13, DIG. 57, DIG. 39, 445, 151; 249/78, 79, 80; 264/322

[56] References Cited

U.S. PATENT DOCUMENTS

| | | | |
|---|---|---|---|
| 2,251,785 | 8/1941 | Dons et al. | 249/79 |
| 2,527,395 | 10/1950 | Burditt | 249/79 |
| 3,063,109 | 11/1962 | Rapaport | 164/412 |
| 3,097,398 | 7/1963 | Inglesby | 249/79 |
| 3,195,479 | 7/1965 | Beck et al. | 425/DIG. 57 |
| 3,309,738 | 3/1967 | Friedman | 249/164 |

FOREIGN PATENT DOCUMENTS 1201338  12/1959  France .

*Primary Examiner*—Khanh P. Nguyen
*Attorney, Agent, or Firm*—Dowell & Dowell

[57] ABSTRACT

A device for melting matter by immersion in a heated vat which includes a basket articulated with respect to a base containing the vat. The basket is resiliently urged upwardly from the vat as a lid covering the basket is raised and members are provided for retaining the basket in its raised position, wherein the basket obstructs access to the vat.

17 Claims, 3 Drawing Sheets

DEVICE FOR MELTING MATTER BY IMMERSION IN A BATH OF HOT LIQUID

BACKGROUND OF THE INVENTION

1. Field of the Invention

The present invention relates to a device intended for melting matter by immersion in a bath of liquid heated to low temperature to create a game for molding the matter.

2. History of the Related Art

Children are known to appreciate creating objects, for example by sculpturing plastics or the like or shaping modelling clay in pre-fabricated molds.

The present invention provides a device enabling the child to soften a plastic material in the form of solid grains, in order to create a paste which may be poured into a mold in which it solidifies on cooling. Such a process evokes industrial molding for children and therefore offers them a very attractive, interesting activity.

The device for carrying out the molding mentioned above comprises a bath of liquid disposed in a heated vat and a basket containing the raw material which is immersed in the bath in order to soften it.

The device according to the invention comprises means for automatically raising the basket into an emerged position in which the molten product is out of the bath, while the basket, in that case, constitutes a protective screen preventing access to the hot bath.

According to the invention, the basket is articulated with respect to a base containing the heating vat and on which a lid covering the basket is pivotally mounted, means are provided to allow the basket to be automatically lifted when the lid is raised, while elastic means are provided on the basket to maintain it in raised position when the lid is open, the lid being provided with means for acting on the elastic means of the basket to deform them to allow the basket to be immersed when the lid is closed.

BRIEF DESCRIPTION OF THE DRAWINGS

The invention will be more readily understood on reading the following description with reference to the accompanying drawings, in which.

DESCRIPTION OF PREFERRED EMBODIMENT

Figure 1:
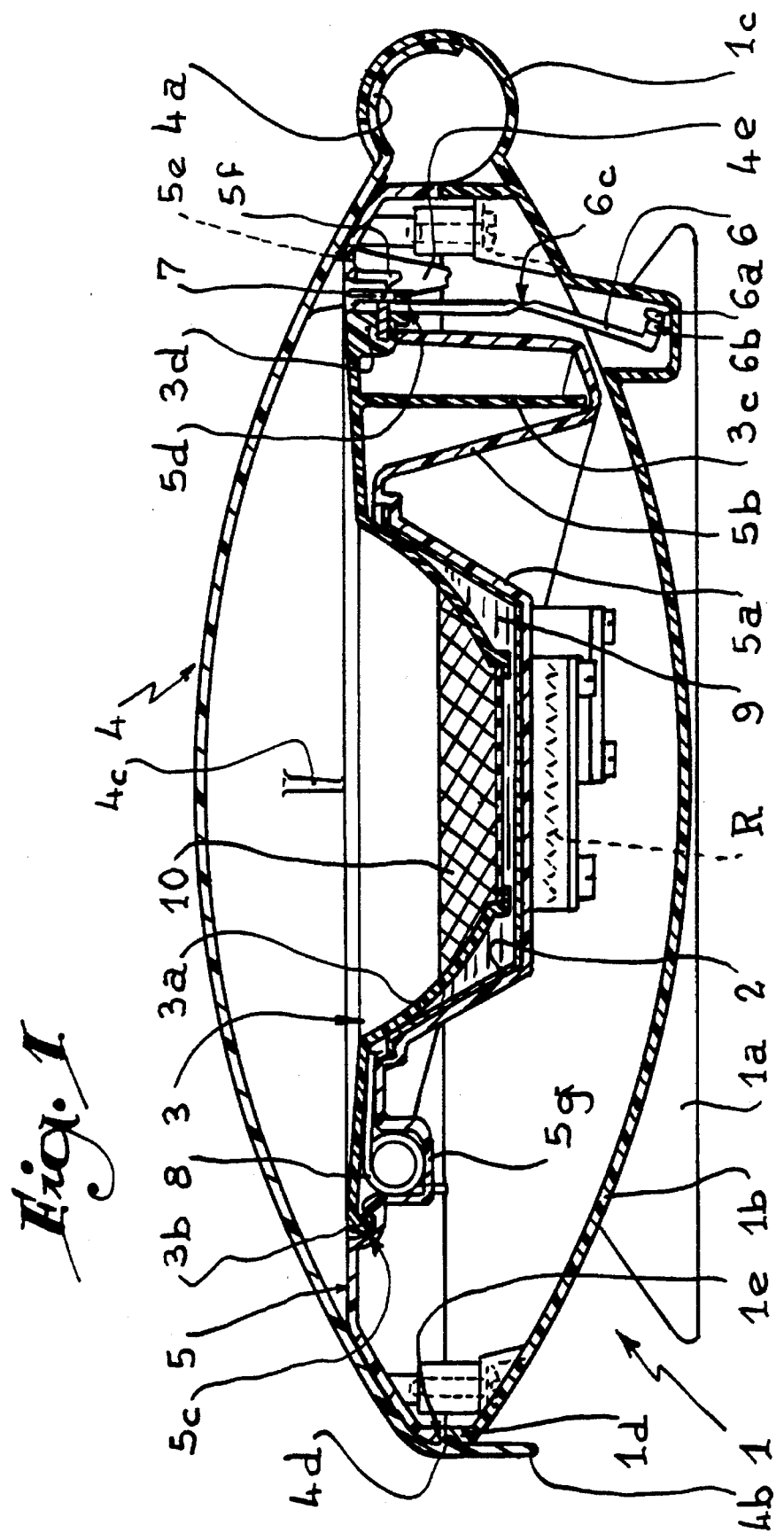
FIG. 1 is a transverse section through the device according to the invention, when closed.
Figure 2:
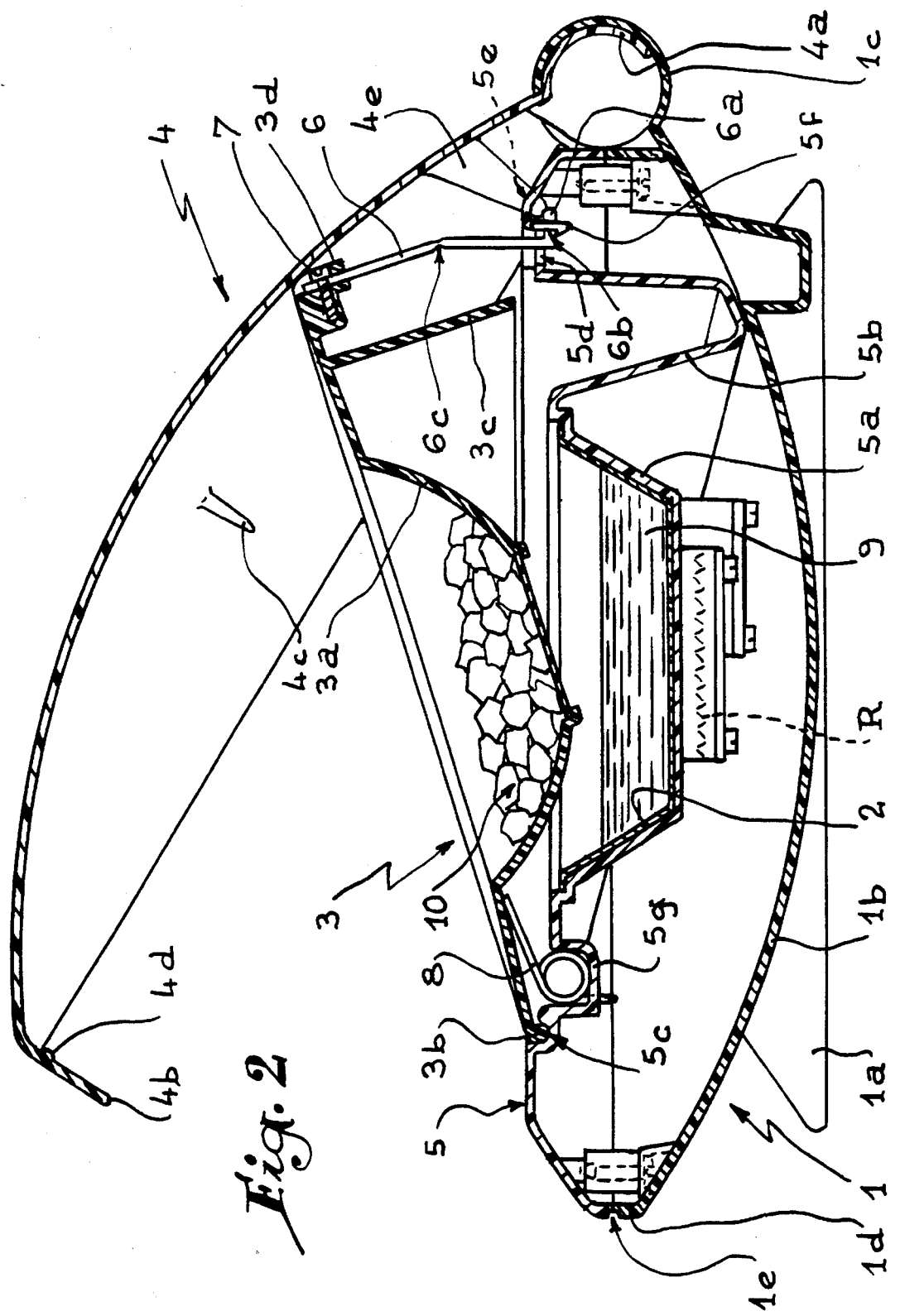
FIG. 2 is a view corresponding to that of FIG. 1, but showing the lid open and the basket emerged from the heating bath.

Referring now to the drawings, FIGS. 1 and 2 illustrate the device according to the invention, which essentially comprises a base 1 containing a central vat 2, a basket 3 having a concave central part 3a perforated with a plurality of small holes and a lid 4.

Base 1 is provided with a stand 1a enabling it to rest on a horizontal surface. It presents an upwardly concave lower wall 1b of which the rear end is made in the form of a forwardly open gutter 1c, the rest of the wall 1b terminating in a vertical edge 1d.

A shell 5 constitutes the upper wall of the base 1 to which it is, for example, welded all along the edge 1d. The center of the shell 5 comprises a depression 5a in which the vat 2 is disposed. Below the depression 5a lies a heating element R. Shell 5 comprises in its rear part a hollow foot element 5b made in the form of a rounded channel of which the lower part comes into abutment against the inner face of the wall 1b to facilitate assembly of the lid and of the base 1.

The basket 3 is in the form of a plate of which the rectilinear front edge 3b is engaged in a groove 5c thus enabling it to pivot so that its central part 3a can come into the vat 2 of complementary shape.

The presence is observed of a rear skirt 3c of the basket which is positioned inside the hollow foot element 5b.

Figure 3:
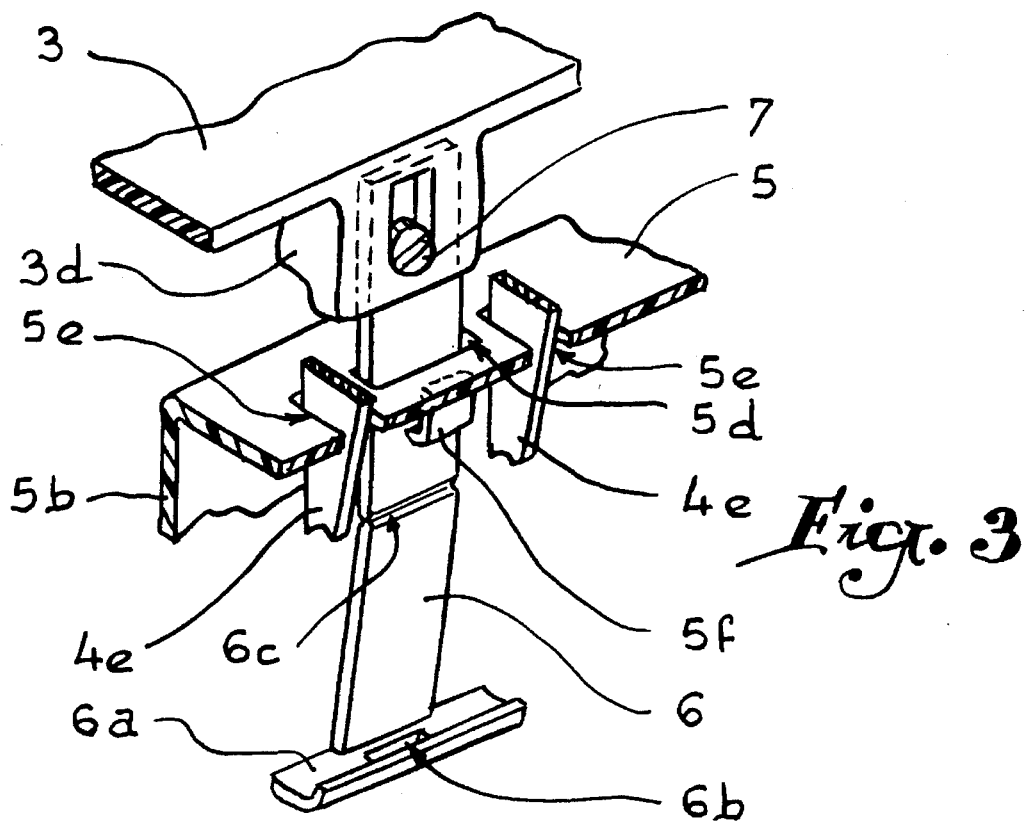
FIGS. 3 and 4 are detailed views, on a larger scale, illustrating the means for locking the basket with respect to the base, respectively in its immersed and emerged positions.

As illustrated in FIG. 3, the rear part of the basket 3 is provided with a vertical flange 3d in which has been made a vertical slot adapted to receive one of the ends of an elastic tab 6 fixed to the flange by means of a screw 7. It will be noted that the other end of the elastic tab comprises a transverse bar 6a of which the center is provided with a notch 6b whose role will be more readily explained hereinbelow.

Tab 6 traverses a passage 5d in the flat rear edge of the shell 5 which also includes two opening notches 5e. The lower face of the rear edge is provided with a hook 5f.

Referring back to FIGS. 1 and 2, it is observed that the general shape of the lid is convex and that its rear edge is constituted by a rounded fold 4a adapted to engage in the gutter 1c so that the lid can pivot therein. The front edge of the lid is provided with a tongue 4b. At least one stud 4c is made inside the lid 4 in order to abut against the periphery of the basket 3. It is observed that the tongue 4b includes a bead 4d adapted to clip in a groove 1e in the front part of the edge 1d of the base 1. Finally, the presence is noted of a torsion spring 8 disposed in an impression 5g in the top of the shell 5, its two ends abutting respectively against the basket 3 and against the base 1, with the result that the basket tends to pivot upwardly when it is in the free state.

The device functions as follows:

When the apparatus is in the position illustrated in FIG. 2, it is possible to pour into the vat 2 a certain quantity of liquid, such as water, to constitute a bath referenced 9. A certain quantity of matter 10 in the form of grains, which it is desired to melt or at least considerably to soften in the bath 9, is then placed in the central part 3a of the basket 3.

Figure 4:
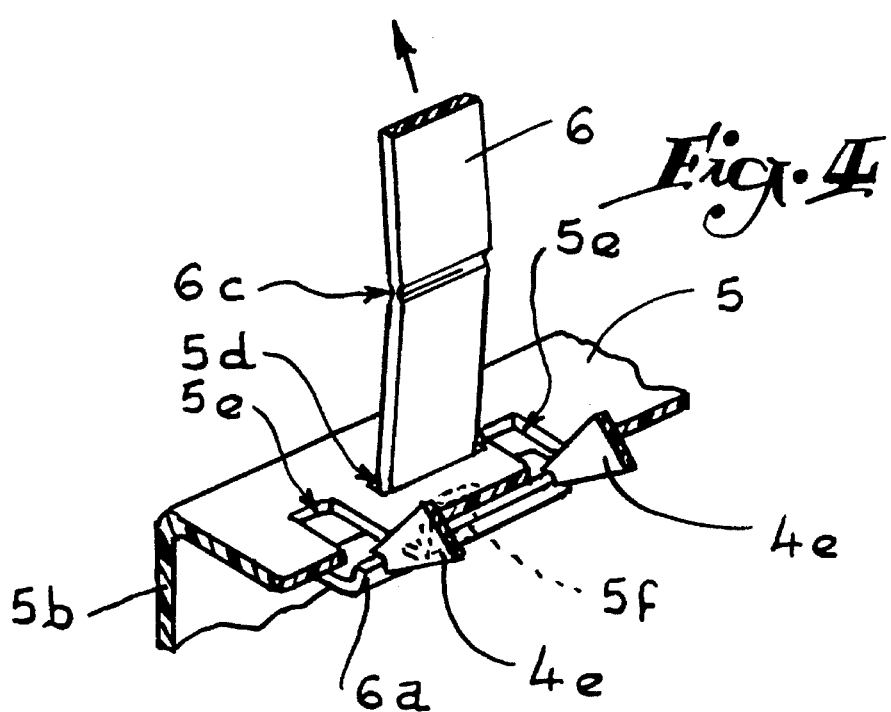

It is observed that, in this open position, the bar 6a of the elastic tab 6 is retained by engagement of hook 5f in notch 6b, as illustrated in FIG. 4. In this position, lid 4 is maintained open by action of the basket 3 against its lower face, due to the reaction of the spring 8.

When it is desired to melt or soften the matter 10, the user closes lid 4, with the result that its pivoting in gutter 1c firstly causes the descent of catches 4e (FIGS. 3 and 4) secured to the lower face of the lid and which, after having traversed notches 5e, act on the flanges of the bar 6a so as to disconnect tab 6 and hook 5f. At the same time, the lid, abutting on basket 3, provokes descent of the latter until studs 4c abut against the periphery of the basket to terminate closure thereof (FIG. 1). When the lid is closed, bead 4d of lid 4 clips in groove 1e of base 1, with the result that the device is then maintained closed. There may be conventionally associated with the base a contact controlled by the lid in order to close a circuit supplying the resistor R placed beneath vat 2. Under these conditions, the bath 9 heats up and communicates the calories necessary for melting or at least softening the plastic matter 10. The power of the resistor R is, of course, determined so that the bath 9 attains the temperature of softening of the matter 10 provided to be around 60° to 70° C.

After a certain time indicated by the notice for use, the plastic matter 10 is softened and it may be used for making molded objects. To that end, lid 4 is opened, which causes basket 3 to pivot upwardly thanks to the action of spring 8. When the lid is open, bar 4 comes beneath the edge of shell 5 and hook 5f engages in notch 6b so that the basket is locked in raised position. This locked position makes it possible to take the molten matter 10 without the possibility of re-immersing basket 3, with the result that the user cannot be burnt in the bath 9. With the basket in this locked position, it constitutes a protective screen preventing access to the hot bath 9.

Any appropriate material may, of course, be used for making the device according to the invention. Plastic materials whose qualities respond to the desired resistance of the different components of the device, are preferably chosen. Concerning tab 6, it is preferably made of polypropylene with a thinned central zone 6c. Similarly, the material constituting shell 5 must be such that it presents a certain rigidity and good resistance to temperature and a certain suppleness in order that hook 5f may be elastic. There again, polypropylene may advantageously be chosen as a material. Vat 2 is made either of plastic material or of stamped metal.

When it is desired to clean the device, screw 7 may be unscrewed, traversing an appropriate small opening (not shown) made in the lid in order to extract the basket.

What is claimed is:

1. A device for melting matter by immersion in a bath of hot liquid comprising:

a base in which a heating vat is contained;

heating means mounted within said base for heating said vat;

a basket for retaining the matter therein, said basket being movable between a lower position within said vat to a raised position above said vat;

retaining means for retaining said basket in said raised position, and said basket being of a configuration to function as a protective cover to obstruct access to said vat when said basket is in said raised position.

2. The device of claim 1 including means for pivotally mounting said basket to said base.

3. The device of claim 2 including a lid pivotally mounted with respect to said base, and resilient means for urging said basket towards said raised position whereby said basket simultaneously moves to said raised position as said lid is pivotally raised relative to said base.

4. The device of claim 3 including means carried by said lid for engaging said retaining means to thereby release said retaining means whereby said basket is lowered to said lower position simultaneously as said lid is pivotally closed relative to said base.

5. The device of claim 4 wherein said retaining means includes a flexible tab mounted to said basket and extending through a passage in said base, said tab having a lower end including a transverse bar, a clip member mounted to said base for engaging said transverse bar when said basket is in said raised position, and said means carried by said lid for engaging said retaining means including at least one catch extending through an open notch in said base, said at least one catch being engageable with said transverse bar of said retaining means to thereby release said transverse bar from said clip member as said lid is lowered to lower said basket to said lower position.

6. The device of claim 5 in which said tab includes upper and lower articulated body portions, a notch in said transverse bar which is selectively engageable by said clip member, a pair of catches extending from said lid through a pair of spaced open notches in said base whereby said pair of catches engage said transverse bar on opposite sides of said notch therein.

7. The device of claim 5 including means for removably mounting said tab to said basket.

8. The device of claim 5 wherein said lid includes at least one stud for engaging said basket when said basket is in said lower position to thereby retain said basket in said lower position and said lid further including a tongue for engaging said base for locking said lid relative to said base.

9. The device of claim 3 in which said resilient means includes a torsion spring mounted within said base and having an arm portion engaging said basket.

10. The device of claim 3 in which said base includes front and rear portions and said lid includes front and rear portions, said rear portion of said base including a concave trough, said rear portion of said lid including an arcuate member configured to be guidingly moveable within said concave trough of said base as said lid is raised and lowered.

11. The device of claim 3 in which said base includes a hollow foot portion, said basket including front and rear portions, said rear portion including a depending skirt receivable within said foot portion of said base when said basket is in said lower position.

12. The device of claim 3 in which said basket includes a plurality of small openings therein.

13. A device for melting matter by immersion in a bath of hot liquid comprising:

a base having front and rear portions, said base further including an upper shell having a vat formed therein intermediate said front and rear portions, a heating element mounted within said base adjacent said vat;

a basket for retaining the matter therein, said basket being moveable between a lower position within said vat to a raised position above said vat, said basket having front and rear portions, and means for pivotally mounting said front portion of said basket to said shell;

a retaining means extending between said basket and said base for retaining said basket in said raised position, said basket being of a configuration to obstruct access to said vat when in said raised position;

a lid having front and rear portions, said rear portion of said lid being pivotally mounted to said rear portion of said base, said lid being moveable from an open position wherein said basket is in said raised position to a closed position wherein said basket is in said lower position;

and, means carried by said lid for disengaging said retaining means to thereby permit said basket to be lowered to said lower position as said lid is moved from said open position to said closed position.

14. The device of claim 13 including resilient means mounted to said shell and engageable with said basket, said resilient means normally urging said basket toward said raised position.

15. The device of claim 14 wherein said retaining means includes a flexible tab mounted to said basket and extending through a passage in said base, said tab having a lower end including a transverse bar, a clip member mounted to said base for engaging said transverse bar when said basket is in said raised position, and said means carried by said lid for engaging said retaining means including at least one catch extending through an open notch in said base, said at least one catch being engageable with said transverse bar of said retaining means to thereby release said transverse bar from said clip member as said lid is lowered to lower said basket to said lower position.

16. The device of claim 15 in which said tab includes upper and lower articulated body portions, a notch in said transverse bar which is selectively engageable by said clip member, a pair of catches extending from said lid through a pair of spaced open notches in said base whereby said pair of catches engage said transverse bar on opposite sides of said notch therein.

17. The device of claim 14 in which said basket includes a plurality of small openings therein.

* * * * *